United States Patent [19]

Exner

[11] 4,058,007
[45] Nov. 15, 1977

[54] VIBRATING WIRE MEASURING INSTRUMENT

[75] Inventor: Rainer Exner, Dransfeld, Germany

[73] Assignee: Sartorius-Werke GmbH, Gottingen, Germany

[21] Appl. No.: 666,952

[22] Filed: Mar. 15, 1976

[30] Foreign Application Priority Data

Apr. 24, 1975   Germany .............................. 2518294

[51] Int. Cl.² ............................................... G01L 5/00
[52] U.S. Cl. ............................... 73/141 A; 73/DIG. 1
[58] Field of Search .......... 73/141 A, DIG. 1, 141 R, 73/517 AV

[56] References Cited

U.S. PATENT DOCUMENTS

| | | | |
|---|---|---|---|
| 3,052,116 | 9/1962 | Critchley et al. ................ | 73/DIG. 1 |
| 3,122,024 | 2/1964 | Trachtenberg ................. | 73/517 AV |
| 3,250,133 | 5/1966 | Savet .............................. | 73/517 AV |

Primary Examiner—James J. Gill
Assistant Examiner—Anthony V. Ciarlante
Attorney, Agent, or Firm—Browdy and Neimark

[57] ABSTRACT

A vibrating wire measuring instrument, such as a vibrating wire galvanometer, dynamometer, or strain gauge, wherein the wire which is to execute transverse vibrations is mounted between two fixing members, and node masses are rigidly attached to the wire so that the latter is subdivided into (a) two connection portions (between the node masses and the fixing members) and (b) an intermediate portion (between the node masses); the wire is of constant cross section and integrally formed; the node mass may be soldered or welded to the wire or clamped, e.g. in a detachable manner.

12 Claims, 5 Drawing Figures

U.S. Patent     Nov. 15, 1977     4,058,007
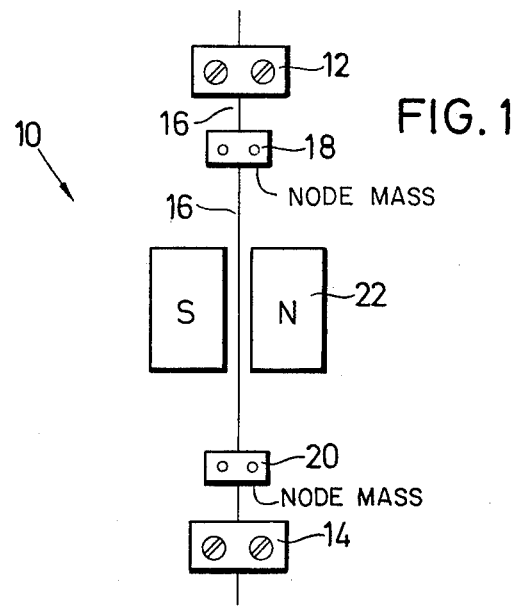
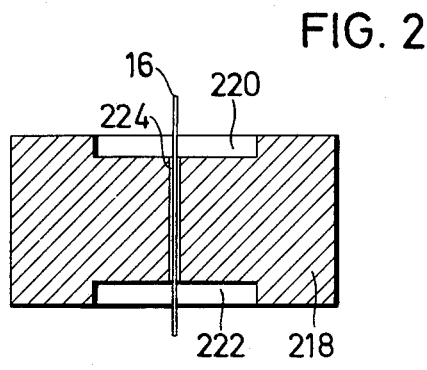
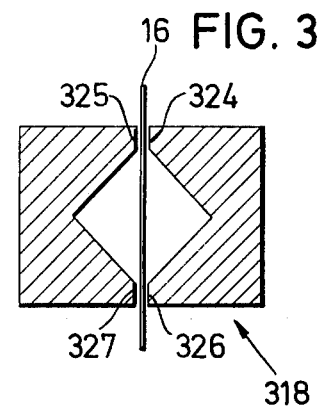
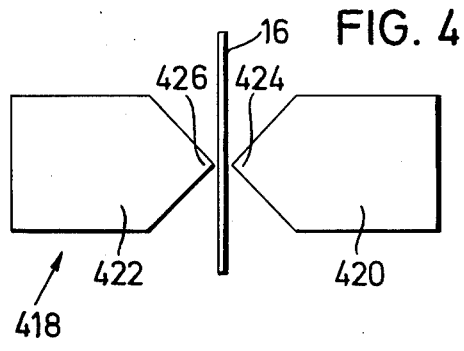
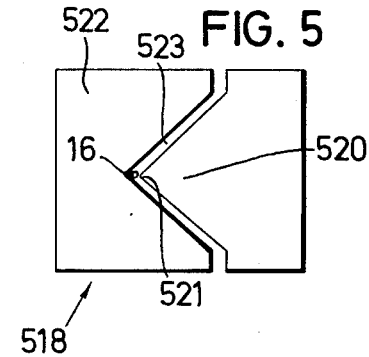

VIBRATING WIRE MEASURING INSTRUMENT

The invention relates to vibrating wire measuring instruments having at least one integral wire which is put under tensile stress between two fixing members which serve for the introduction of energy and which wire executes transverse vibrations on excitation. The wire is subdivided by masses constituting vibration nodes into (a) two connection portions connected to the fixing members and (b) an intermediate portion lying in line between the nodes.

A vibrating wire measuring instrument of this type may be a vibrating wire balance, a vibrating wire dynamometer or a vibrating wire ("acoutsic") strain gauge.

In a known vibrating wire measuring instrument of this type (German Gebrauchmuster 72 20 123) the connection portions include fixing members in the form of flexible joints such that they disconnect the wire at both ends, in at least one plane passing through the wire axis, from the adjoining parts of the apparatus. To this end, the fixing members each have, in one plane at least, a sector having a rectangular cross-section.

In another form of construction of this known vibrating wire measuring instrument the fixing members take the form of knuckle joints.

In this known vibrating wire measuring instruments the fixing members may be produced integrally with the portion of the wire which can be excited into transverse vibrations.

The connection portions in the form of knuckle or flexible joints make possible not only a passive disconnection, that is to say the isolation of external vibrations from the portion of the wire which can be set in transverse vibration, but also an active disconnection, that is to say the prevention of an outflow of energy from the portion of the wire which can be excited into transverse vibration. This results in an instrument that is kept as free as possible from interfering vibrations and resonances.

In the case of this known instrument, the production of the wire with the connection portions in the form of flexible joints or knuckle joints is very elaborate and, for example when knuckle joints constitute the connection portions, necessitates a considerable length for the apparatus.

in another known vibrating wire measuring instrument (Swiss Patent 552,799) spring elements are connected in line with the wire for the purpose of isolation and they have the effect of a mechanical low-pass filter. However, it is proposed for this known instrument that the wire itself be constructed with node masses and holding elements in addition, although it is not possible to deduce from the publication describing this instrument how the node masses are to be constructed.

The problem underlying the invention is to design a vibrating wire measuring instrument in such a way that, by means of simple construction, good isolation between the wire and the remaining parts of the device (and if necessary between a number of wires) is obtained. Also a minimum creep in the region of the masses limiting the portion of the measuring wire which can be excited into transverse vibration and an optimal hysteresis behaviour are desirable.

According to the invention there is provided a vibrating wire measuring instrument having at least one integral wire mounted between a pair of fixing members, said wire being of constant cross-section over its length and being subdivided by masses attached rigidly to the wire, forming vibrational nodes, into two connection portions and an intermediate portion, each connection portion extending between a said vibrational node mass and a fixing member and the intermediate portion extending between the vibrational node masses, said instrument being adapted to enable energy to be introduced into the or each wire and to enable said intermediate portion to be excited into transverse vibrations.

Such an instrument may be prepared by mounting the wire between the fixing members and subsequently attaching the masses at the desired node positions.

In one advantageous form of instrument of the invention, the node masses are connected to the wire by soldering or welding, and in a further development the soldering or welding extends over a part only of the axial length of the node mass.

In another form of preferred construction, the node masses are connected to the wire by clamping, each node mass advantageously having two clamping positions disposed at a distance from one another in the longitudinal direction of the wire.

Irrespective of whether each node mass has one or two clamping positions, the clamps of the node masses are preferably constructed in the form of pairs of clamping jaws, and in accordance with a further aspect of the invention, the pair of clamping jaws has two jaws of the same construction, while in another development there is one wedge-shaped jaw with a clamping edge and, complementary therewith, a jaw with a triangular recess. Finally, in another, third, further development, the pair of clamping jaws may take the form of knife edges.

An important advantage of the invention rests in the fact that it provides good isolation of the wire from the apparatus as a whole, and (if necessary) a number of wires from one another. It can also prevent creep in the region of the rigid connection between the wire and the node masses, while there is a very low hysteresis. Furthermore, the construction of the wire is kept extremely simple. It is important that the wire should not differ in its construction from a wire of the kind used previously, without node masses.

This leads to the further advantage that the node masses can be attached subsequently to the wires of vibrating wire measuring instruments which have been constructed in the usual manner without node masses. In this connction the diameter and cross-section of the wire are of no significance.

Even when these node masses are attached subsequently to the wires of the known type of vibrating wire measuring instruments without node masses, the smallest possible hysteresis results.

In a particularly preferred form of construction, the node masses are clamped to the wire in a detachable manner while, furthermore, the wire advantageously has a circular cross-section.

This form of construction has the important advantage that the length of the portion of measuring wire which can be excited into transverse vibrations can easily be altered at any time, thus permitting the instrument to be tuned optimally according to its application.

Since the parts between each fixing member and the neighbouring node mass are parts of the wire itself, with the same cross-section as the actual measuring part of the wire, the whole wire — especially if it has a circular cross-section — has, between each fixing member and the neighbouring node mass, a universal joint, which has optimal operation, being capable of movement not only in one direction, as in flexible joints, or in two directions at right-angles to one another as in a knuckle joint, but in all directions extending radially away from the wire. Naturally, the total mass of each node mass must be so chosen relative to the mass of the wire as to produce a true vibration node in the wire at the place where it is attached, that is to say to execute practically no transverse vibrations itself when the portion of the measuring wire which can be excited into transverse vibration is set vibrating.

Preferred features of the invention are described below, by way of example, with reference to the drawing, wherein:

FIG. 1 is an elevation of a measuring wire which is put under tensile stress between two fixing members and which has two masses forming vibration nodes;

FIG. 2 shows a portion of the measuring wire with a node mass which is connected to the wire by soldering or welding;

FIG. 3 is a view similar to FIG. 2, in which the node mass has two pairs of clamping jaws disposed at a distance from one another in the longitudinal direction of the wire, the jaws of each pair being of the same construction;

FIG. 4 is an elevation similar to FIG. 2 or 3 in which the pair of clamping jaws is in the form of knife edges; and FIG. 5 is a plan view of a pair of clamping jaws with one wedge-shaped jaw, designed with a clamping tip, and a jaw with a triangular recess complementary to the wedge-shaped jaw.

As shown in FIG. 1 a vibrating wire measuring instrument comprises an upper fixing member in the form of a clamping member 12 and a lower fixing member, also in the form of a clamping member 14, between which a wire 16 is put under tensile stress.

Introduction of energy into the wire is effected at these fixing members 12 and 14. For example the fixing member 12 may be permanently fixed whereas the fixing member 14 is connected to a movable measuring part. In this case energy is introduced in such a way that it tends to draw the measuring part downwards in the direction of the longitudinal axis of the wire while the fixing member 12 constitutes the end support. It is also possible, however, for the fixing member 14 to be made stationary and the fixing member 12 to be conected to a movable measuring part. In this case, the introduction of energy is effected so that the energy tends to move the measuring part upwards in the longitudinal direction of the wire, the fixing member 14 constituting the end support.

The wire represented in FIG. 1 is in one piece, with a constant cross-section throughout its entire length, and is retained in the fixing members 12 and 14 by being clamped in.

Masses 18 and 20 constituting vibration nodes are rigidly attached to the wire 16 at a distance from the fixing members 12 and 14 between the latter.

Various forms of construction of node masses are shown in FIGS. 2 – 5.

As shown in FIG. 1 there is also an excitation magnet 22 disposed around the wire 16 between the node masses 18 and 20, which magnet, during measuring operation, excites into transverse vibrations the portion of the wire lying between the node masses 18 and 20.

A first form of construction of the node masses is shown in FIG. 2 and is indicated by the reference 218. The node mass 218 is in the form of a circular cylinder piece which has a coaxial circular depression 220 or 222 in both the upper and the lower end face. The cylinder piece 218 is also provided with a central bore 224 through which the wire 16 is passed and in which the wire 16 is soldered or welded. Here the soldering or welding material may be chosen so that between the cylinder piece of hard material and the wire a softer transition layer is formed.

The cylinder piece shown in FIG. 2 may have a cross-section which is other than circular, for example square or rectangular.

A further form of construction of the node masses is shown in FIG. 3 with the reference 318. The node mass 318 is in the form of two identical portions 320 and 322 which are connected to the wire 16 only in the region of their two front faces which are opposite in the longitudinal direction of the wire 16 and are in the form of two pair of clamping jaws 324, 325, 326, 327. Thus each node mass 318 is rigidly connected to the wire 16 by way of two clamping positions disposed at a distance from one another in the longitudinal direction of the wire 16.

As can be seen from FIG. 4, in another form of construction of a node mass 418 consisting of two parts 420 and 422, the latter may be in the form of knife edges which, in the form of construction shown, are formed by wedge apices 424 and 426. Here it is possible to provide each node mass with a single clamping position designed in the form of knife edges or with two clamping positions disposed at a distance from one another in the longitudinal direction of the wire 16, again in the form of knife edges. If two clamping positions in the form of knife edges are to be provided for each node mass this can be carried out for example in a similar manner to the form of construction shown in connection with FIG. 3.

Finally, in FIG. 5 there is shown another form of construction for the clamping positions illustrated by a plan view of a node mass 518. In this case the clamping position comprises a wedge-shaped clamping jaw 520 which ends in a sharp, or else a slightly chamfered edge 521, and a clamping jaw 522 with a triangular recess 523 complementary to the wedge-shaped clamping jaw 520. In this form of construction also it is possible for each node mass 518 to have a single clamping position, for example as in the form of construction shown in FIG. 2.

On the other hand, however, the node mass 518 may also be provided with two clamping positions disposed in the longitudinal direction of the wire 16, similar to the form of construction shown in FIG. 3.

In the form of construction in FIG. 2, each node mass is rigidly connected to the wire 16 round its entire periphery by soldering or welding, and an annular, softer intermediate layer is provided between the node mass 218, consisting of hard material of high specific gravity, and the wire 16 which likewise consists of hard material.

FIG. 3 shows that the node mass 318 is connected to the wire 16 at each clamping position by way of two diagonally opposite clamping surfaces which extend in a peripherally limited manner. If the clamping jaws of the clamping positions, which are of the same construction, form plane surfaces, the clamping surface extends only a short distance in the peripheral direction. However, if the clamping jaws are designed with a depression corresponding to the circumference of the wire 16, the clamping surfaces extend over a longer distance in the peripheral direction.

The node mass 418 illustrated in FIG. 4 is rigidly connected to the wire 16 at the clamping position, owing to the knife edges provided there, over a narrowly limited area on two sides situated diagonally opposite.

The clamping position in the form of construction of the node mass 518 represented in FIG. 5 is of a different design. In this case the clamping between the node mass 518 and the wire 16 at the clamping position is effected by way of three very narrow clamping surfaces, extending linearly in the longitudinal direction of the wire 16, each of which — seen in the cross-section of the clamping position — lies at the corner of an isosceles triangle and thus is precisely located.

As is indicated schematically in FIG. 1, the wire 16 is clamped into the fixing members 12 and 14 in a detachable manner and the node masses 18 and 20 are likewise detachably clamped onto the wire 16. Since the node masses 18 and 20 are clamped on in a detachable manner, it is possible at any time to readjust the measuring device very precisely or else, if necessary, to set other effective lengths for the portion of the measuring wire situated between the node masses 18 and 20.

It should be noted, finally, that the parts of the wire 16 located between the fixing member 12 and the node mass 18, or the fixing member 14 and the node mass 20, constitute an optimal universal joint — especially if the wire 16 has a circular cross-section — and thus with a relatively short distance between each node mass and the next clamping member ensures optimal disconnection, independently of the direction of vibration.

If each node mass has two clamping positions disposed at a distance from one another in the longitudinal direction of the wire 16, in a manner similar to that in the form of construction represented in FIG. 3, it is not essential for both the clamps to be of the same construction. Rather is it possible to combine the various forms of clamping constructions shown in FIGS. 3 - 5 so as to achieve an optimal result. For example, it may be advantageous to design a clamp constructed as shown in FIG. 4 with knife edges in order to retain optimal mobility of the part of the wire extending from this clamping position away from the node mass, whereas the other clamping position may be designed according to the construction shown in FIG. 3 or FIG. 5, in order to couple the relatively big mass of the node masses to the wire 16 other than through sharp knife edges alone.

A vibrating wire measuring instrument of the described type may also be a vibrating string balance or a vibrating string measuring instrument, i.e. a balance using a vibrating string as a main element.

Furthermore it is to be understood that the masses will be attached rigidly to the wire or string subsequently to mounting the wire or string between the pair of fixing members.

I claim:

1. A vibrating wire measuring instrument for measuring forces, especially a wire balance comprising: at least one integral wire mounted between a pair of fixing members, at least one of said fixing members being movable with respect to the other in response to an applied force and said wire being of constant cross-section over its length; and two decoupling masses attached rigidly to said wire, forming vibrational nodes and dividing said wire into two connection nonvibrating portions between each of said masses and a respective one of said fixing members and into an intermediate vibrating portion, each nonvibrating connection portion extending between one of said vibrational nodes and a fixing member and the intermediate vibrating portion extending between the vibrational node decoupling masses; whereby the instrument enables energy to be introduced into said wire and cause said intermediate portion to be excited into transverse vibrations at a frequency representative of the force applied to the movable fixing member.

2. An instrument according to claim 1 wherein at least one said node mass has been attached rigidly to the wire by soldering or welding.

3. An instrument according to claim 2 wherein the soldering or welding extends over only a part of the axial length of the or each node mass.

4. An instrument according to claim 1 wherein at least one node mass is attached rigidly to the wire by clamping means.

5. An instrument according to claim 4 wherein the or each clamped node mass has two clamping positions disposed at a distance from one another in the longitudinal direction of the wire.

6. An instrument according to claim 4 wherein the clamping means are in the form of pairs of clamping jaws.

7. An instrument according to claim 4 wherein the clamping means are in the form of pairs of clamping jaws, each said pair having two identically constructed jaws.

8. An instrument according to claim 4 wherein the clamping means are in the form of pairs of clamping jaws, each said pair having a first wedge-shaped jaw with a sharp or chamfered clamping edge and, complementary to the first jaw a second jaw with a triangular recess.

9. An instrument according to claim 4 wherein the clamping means are in the form of pairs of clamping jaws, each said pair having knife edges for clamping to the wire.

10. An instrument according to claim 4 wherein the node masses are detachably clamped to the wire.

11. An instrument according to claim 1 wherein the wire is of circular cross-section.

12. A vibrating wire measuring instrument according to claim 1 and when in the form of an instrument selected from the group consisting of vibrating wire balances, dynamometers, and strain gauges.

* * * * *